United States Patent [19]

Bartosik

[11] Patent Number: 6,101,467
[45] Date of Patent: Aug. 8, 2000

[54] METHOD OF AND SYSTEM FOR RECOGNIZING A SPOKEN TEXT

[75] Inventor: Heinrich Bartosik, Vienna, Austria

[73] Assignee: U.S. Philips Corporation, New York, N.Y.

[21] Appl. No.: 08/939,548

[22] Filed: Sep. 29, 1997

[30] Foreign Application Priority Data

Sep. 27, 1996 [EP] European Pat. Off. .............. 96890151

[51] Int. Cl.[7] ............................ G10L 15/06; G10L 15/26
[52] U.S. Cl. ........................... 704/235; 704/244; 704/257
[58] Field of Search .................................. 704/231, 235, 704/243, 244, 270, 276, 250, 255, 257

[56] References Cited

U.S. PATENT DOCUMENTS

| | | | |
|---|---|---|---|
| 5,027,406 | 6/1991 | Roberts et al. ......................... | 704/244 |
| 5,031,113 | 7/1991 | Hollerbauer ............................. | 704/235 |
| 5,251,283 | 10/1993 | Honis ..................................... | 704/200 |
| 5,315,689 | 5/1994 | Kanazawa et al. ..................... | 704/238 |
| 5,615,296 | 3/1997 | Stanford et al. ........................ | 704/271 |
| 5,787,230 | 7/1998 | Lee ......................................... | 704/235 |
| 5,857,099 | 1/1999 | Mitchell et al. ........................ | 704/235 |
| 5,864,805 | 1/1999 | Chen et al. ............................. | 704/235 |
| 5,909,666 | 6/1999 | Gould et al. ............................ | 704/251 |

FOREIGN PATENT DOCUMENTS

WO 9717694   5/1997   WIPO .

Primary Examiner—David R. Hudspeth
Assistant Examiner—Martin Lerner
Attorney, Agent, or Firm—Tony E. Piotrowski

[57] ABSTRACT

A system for recognizing spoken text includes a microphone for converting spoken text uttered by a speaker into analog electrical signals. An analog to digital converter to convert the analog spoken text data into digital electronic signals. A speech recognition device uses a lexicon data device; a language model data device; and a reference data device to convert the digital spoken text into recognized text data. The system also includes a keyboard for entering error correction data and an error correction device which generates corrected text depending on the corrected text. Adaptation apparatus of the lexicon data device and adaption apparatus of the language model data device, adapt the lexicon data and the language model data respectively to the speaker depending on the corrected text. Then a second speech recognition process is carried out by the speech recognition device depending on the original spoken text, the adapted lexicon data and the adapted language model data to generate newly recognized repeated text which is transmitted to the reference data device. Adaption apparatus of the reference data device or speech recognition device, adapt the reference data to the speaker depending on the recognized repeated text.

10 Claims, 4 Drawing Sheets

METHOD OF AND SYSTEM FOR RECOGNIZING A SPOKEN TEXT

FIELD OF THE INVENTION

The invention relates to the field of speech recognition user interfaces.

BACKGROUND OF THE INVENTION

The invention relates to a method of recognizing a spoken text. The spoken text uttered by a speaker, is converted into first digital data which represent the spoken text. The first digital data are subjected to a speech recognition process depending on: available lexicon data which represent a lexicon; available language model data which represent a language model; and available reference data which represent phonemes. Second digital data which represent a recognized text are generated by the process. The recognized text is displayed using the second digital data. Third digital data are generated to correct the recognized text represented by the second digital data and a part of the second digital data are replaced by the third digital data, and as a result, fourth digital data which represent a corrected text, are obtained. Adaptation data for adapting the available reference data to the speaker of the spoken text are generated with the aid of the first digital data and the fourth digital data. Finally, the available reference data are adapted to the speaker of the spoken text with the aid of the adaptation data and the first digital data so as to obtain adapted reference data.

The invention further relates to a system for recognizing a spoken text. The system includes a conversion device by which the spoken text uttered by a speaker can be converted into first digital data which represent the spoken text. The system also includes a lexicon data device for available lexicon data which represent a lexicon and which are stored in the lexicon data device. The system has a language model data device for available language model data which represent a language model and which are stored in the language model data device. The system also has a reference data device for available reference data which represent phonemes and which are stored in the reference data device. The system includes a speech recognition device, with which the lexicon data device, the language model data device and the reference data device cooperate, and to which the first digital data is supplied and which supplies supply second digital data which represent a recognized text and which are generated during a speech recognition process carried out on the basis of the first digital data. The system has a display device to which the second digital data are applied in order to display the recognized text. The system has an error correction device for the correction of the text represented by the second digital data and by which digital data can be entered. A part of the second digital data are replaced by the third digital data, thereby generating fourth digital data, which represent a corrected text. Finally the system includes adaptation means to which the first digital data and the fourth digital data are applied and by which adaptation data for adapting the available reference data to the speaker of the spoken text can be generated. The adaptation data and first digital data are applied to the reference data device to adapt the available reference data to the speaker of the spoken text and the reference data adapted to the speaker of the spoken text stored in the reference data device.

A method of the type defined in the opening paragraph and a system of the type defined in the second paragraph are known from a so-termed speech recognition system which is commercially available from the Applicant under the type designation SP 6000. This known method will be described hereinafter with reference to FIG. 1. In FIG. 1 the various steps of the methods which are relevant in the present context are represented diagrammatically as blocks.

In known methods of recognizing text spoken into a microphone, shown diagrammatically in FIG. 1, by a speaker, the spoken text in the form of analog electric signals supplied by the microphone 1, is converted, in block 2, into first digital data by an analog-to-digital conversion process performed by an analog-to-digital converter. The resulting digital data representing the spoken text are stored in memory block 3.

Moreover, the first digital data representing the spoken text are subjected to a speech recognition process performed by a speech recognition device in block 4. In this speech recognition process, processing depends on: lexicon data representing a lexicon and available in a lexicon data device in block 5; language model data representing a language model and available in a language model data device in block 6; and reference data representing phonemes and available in a reference data device in block 7. The lexicon data represent not only words of a lexicon but also the phoneme sequences associated with the words, i.e. the phonetic script. The language model data represent the frequency of occurrence of words as well as the frequency of occurrence of given sequences of words in texts. The reference data represent digital reference patterns for phonemes, i.e. for a given number of phonemes, which are pronounced differently by different speakers in a speaker-specific manner, as a result of which, there are a multitude of speaker-specific reference patterns which form a speaker-specific reference data set for each phoneme. The quality of a speech recognition process improves as the reference data sets improve, i.e. if the reference patterns contained therein, are better adapted to a speaker. For this reason, the known method adapts the reference data to each speaker, as will be explained hereinafter. The better the corrected text obtained by correcting the recognized text, matches a spoken text the better this adaptation performs.

In the speech recognition process of block 4, phonemes and phoneme sequences are recognized on the basis of the first digital signals representing the spoken text with the aid of the reference data representing the phonemes and, finally, words and word sequences are recognized on the basis of the recognized phonemes and phoneme sequences and with the aid of the lexicon data and the language model data.

In block 4, second digital data are generated which represent recognized text. These second digital data are loaded into memory block 8.

In block 9, the recognized text is displayed on display device 10 using the second digital data. The display device is preferably a monitor, shown diagrammatically in FIG. 1. The purpose of displaying the recognized text is to give a speaker or user such as a typist, the opportunity to check the recognized text and to correct errors in the recognized text, preferably, error detection which occurs during the speech recognition process and the system points out the likely errors for correction.

In order to enable the recognized text to be checked in a simple manner, the first digital data representing the spoken text, stored in memory, are re-converted into analog electric signals in a digital-to-analog conversion process performed by a digital-to-analog converter in block 11. The signals are subsequently applied to loudspeaker 12, shown diagrammatically in FIG. 1, for acoustic reproduction of the spoken text. By listening to the acoustically reproduced spoken text and by simultaneously reading the displayed recognized text, the recognized text can be checked very simply for exactness or errors.

When the user detects an error in the recognized text in the speech recognition process in block 4, the user can carry out a correction process using an error correction device in the block 13. Using a keyboard 14 as shown diagrammatically in FIG. 1, the user generates third digital data to correct the recognized text represented by the second digital data. The second digital data are partly replaced by the third digital data in order to correct the recognized text in block 13, i.e. text portions, words or letters recognized as being incorrect by the user are replaced by the correct text portions, words or letters entered using keyboard 14. This partial replacement of the second digital data with the entered third digital data, results in fourth digital data representing a corrected text. The fourth digital data representing the corrected text, are loaded into memory block 15. The stored fourth digital data are displayed in block 16 on display device 10, as shown diagrammatically in FIG. 1. This concludes the actual speech recognition process in the known method.

However, as already stated hereinbefore, it is very effective in such a speech recognition process to adapt the reference data available in a reference data device in block 7 to the relevant speaker. This results in improved recognition quality during a subsequent speech recognition process of a further spoken text. In order to adapt the available reference data in the known method, adaptation data for the adaptation of the available reference data to the speaker of the spoken text are generated using the first digital data and the fourth digital data. The available reference data representing the phonemes are adapted to the speaker of the spoken text using the generated adaptation data and the first digital data, so that reference data adapted to the speaker of the spoken text are obtained. To generate the adaptation data, the known method carries out a verification process using a verification device in block 17. To carry out this verification process, the verification device receives the first digital data representing the spoken text as indicated by arrow 18, the second digital data representing the recognized text as indicated by arrow 19, the fourth digital data representing the corrected text as indicated by arrow 20, the lexicon data as indicated by arrow 21, and the reference data as indicated by arrow 22. Using all the data applied to it and complex heuristic methods in the verification process in block 17, in which inter alia a new speech recognition process is carried out, the verification device determines those text parts in the corrected text which best match corresponding text parts in the spoken text. The verification device uses the text recognized by the speech recognition device during the speech recognition process of a spoken text in block 4, taking into account the corrected text subsequently obtained by correction. These best matching text parts of the spoken text and the corrected text are represented by digital data, which form the afore-mentioned adaptation data. These adaptation data are loaded into memory block 23.

Furthermore, the adaptation data stored in memory block 23 and the first digital data stored in memory block 3 are used to adapt the reference data stored in the reference data device in block 7, as indicated by arrows 24 and 25. As a result of this adaptation, the reference data (i.e. the reference patterns for the various phonemes) are better adapted to a speaker, which leads to better recognition quality during a subsequent speech recognition process of uttered by this speaker text.

As is apparent from the above description of the known method, the known speech recognition system SP 6000 includes a separate verification device forming the adaptation apparatus for generating adaptation data by which the reference data available in the reference data device adapted to a speaker of a spoken text using the first digital data. The first digital data, the second digital data, the fourth digital data, the lexicon data, and the reference data are applied to this verification device. Using all the data applied to it and complex heuristic methods in a verification process in which, as already stated, a new speech recognition process is carried out, the verification device determines those text parts in the corrected text which best match corresponding text parts in the spoken text, taking into account the corrected text, and the verification device generates the adaptation data corresponding to the best matching text parts thus determined.

The above citations are hereby incorporated in whole by reference.

SUMMARY OF THE INVENTION

The applicants have recognized limitations in the known speech recognition method. The verification device of the known speech recognition system is very intricate and complex because a large amount of data is processed and analyzed by intricate heuristic methods. Moreover, the verification cycles of a verification process of the verification device are very complicated, requiring comparatively long processing times, which is unfavorable. Besides, it has been found that in spite of the provision of the complex verification device in the known speech recognition system, the adaptation of the reference data to a speaker of a spoken text proceeds comparatively slowly in some cases. For example owing to unsatisfactorily adapted reference data during a verification process, only a comparatively incorrect speech recognition process occurs. Then a comparatively large text part is extracted by the verification device owing to the error content and, consequently, only a comparatively small text part is available to serve as adaptation data for adapting the reference data. This leads to the problem of comparatively poorly adapted reference data, and as a consequence, there is a substantial need for a rapid and effective adaptation of the reference data.

It is an object of the invention to preclude the aforementioned problems and to improve a method of the type defined in the opening paragraph as well as a system of the type defined in the second paragraph in a simple manner, in order to achieve the adaptation of reference data to the speaker of a spoken text at minimal cost yet comparatively rapidly and satisfactorily.

In order to achieve this object according to the invention, both the available lexicon data and the available language model data are adapted to the speaker of the spoken text using the fourth digital data, after obtaining of the fourth digital data which represent the corrected text. Subsequently the first digital data which represent the spoken text, are again subjected to a speech recognition process depending on the adapted lexicon data, the adapted language model data, and the available reference data, and in which fifth digital data which represent a newly recognized text, are generated. The fifth digital data are used as adaptation data and in conjunction with the first digital data are used to adapt the available reference data to the speaker of the spoken text.

Moreover, according to the invention, the adaptation apparatus are formed by the speech recognition device, the lexicon data device and the language model data device. The fourth digital data can be applied to the lexicon data device and the language model data device to adapt the available lexicon data and the available language model data to the speaker of the spoken text. Using the speech recognition device, fifth digital data which represent a newly recognized text, can be generated during a new speech recognition process using the first digital data after the adaptation of the lexicon data and the language model data. The fifth digital data, used as adaptation data, together with the first digital data can be applied to the reference data device in order to adapt the available reference data to the speaker of the spoken text.

In accordance with the invention the adaptation apparatus for the generation of adaptation data by which the reference data available in the reference data device can be adapted to the speaker of a spoken text, provided using unit which are already present, i.e. by the speech recognition device, the lexicon data device and the language model data device. As a result, no separate means—such as a verification device—are required, which is advantageous for simple and low-cost implementation. Adapting the reference data to the speaker of a spoken text, with the aid of adaptation data in the form of fifth digital data representing a newly recognized text, has the advantage that the adaptation of the reference data can proceed comparatively rapidly and very effectively. This is because in the case of a text newly recognized by the speech recognition device, it may be assumed that most of the newly recognized text matches the spoken text very well, and as a consequence, the adaptation of the reference data using the fifth digital data representing the newly recognized text and the first digital data representing the spoken text can be rapidly and effectively performed.

In a system in accordance with the invention it is particularly advantageous if the system is implemented by using a personal computer. This is very advantageous in view of an implementation which is as efficient as possible.

DETAILED DESCRIPTION OF THE PREFERRED EMBODIMENT

Figure 1:
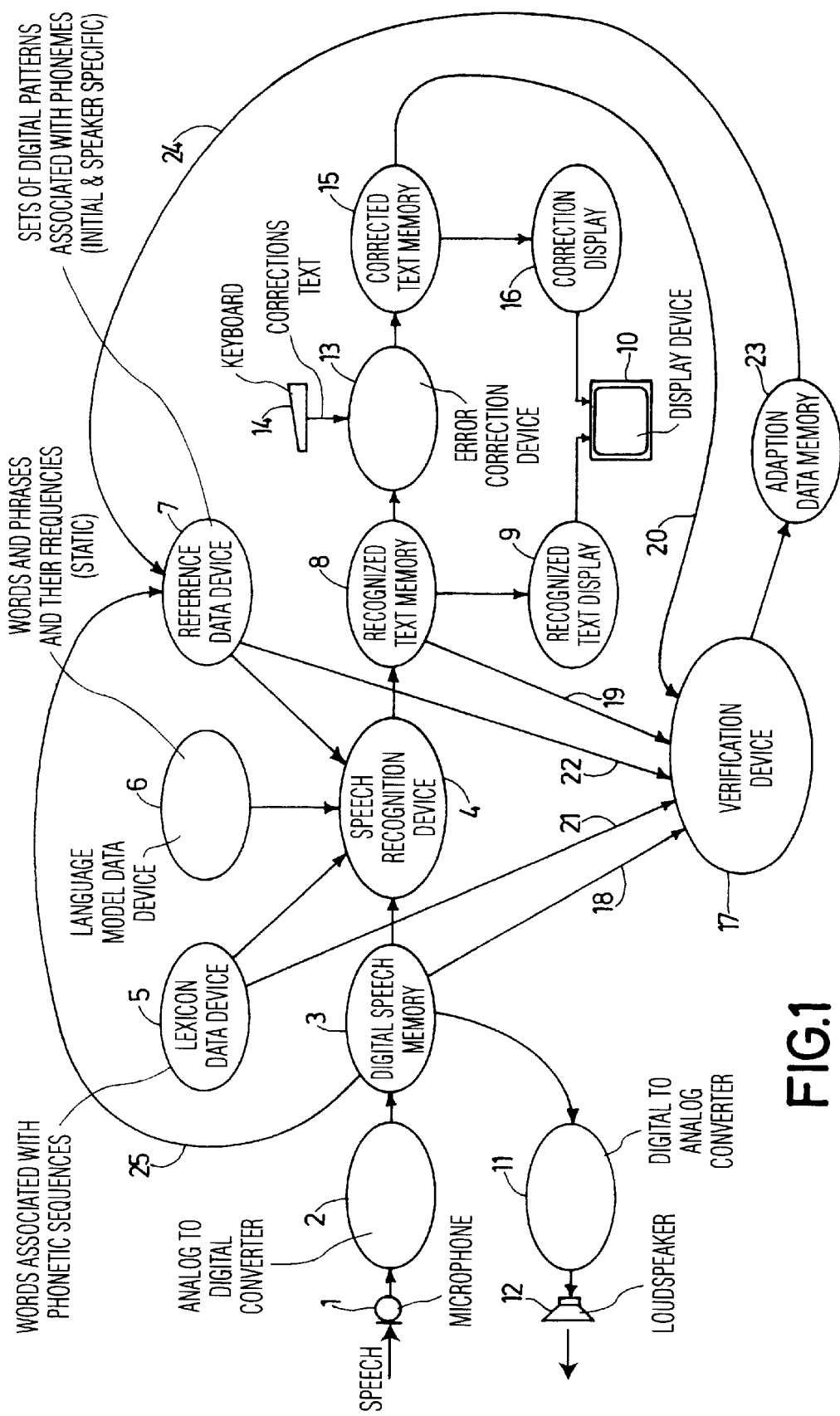
FIG. 1 shows diagrammatically by means of blocks a method of recognizing a spoken text.
Figure 2:
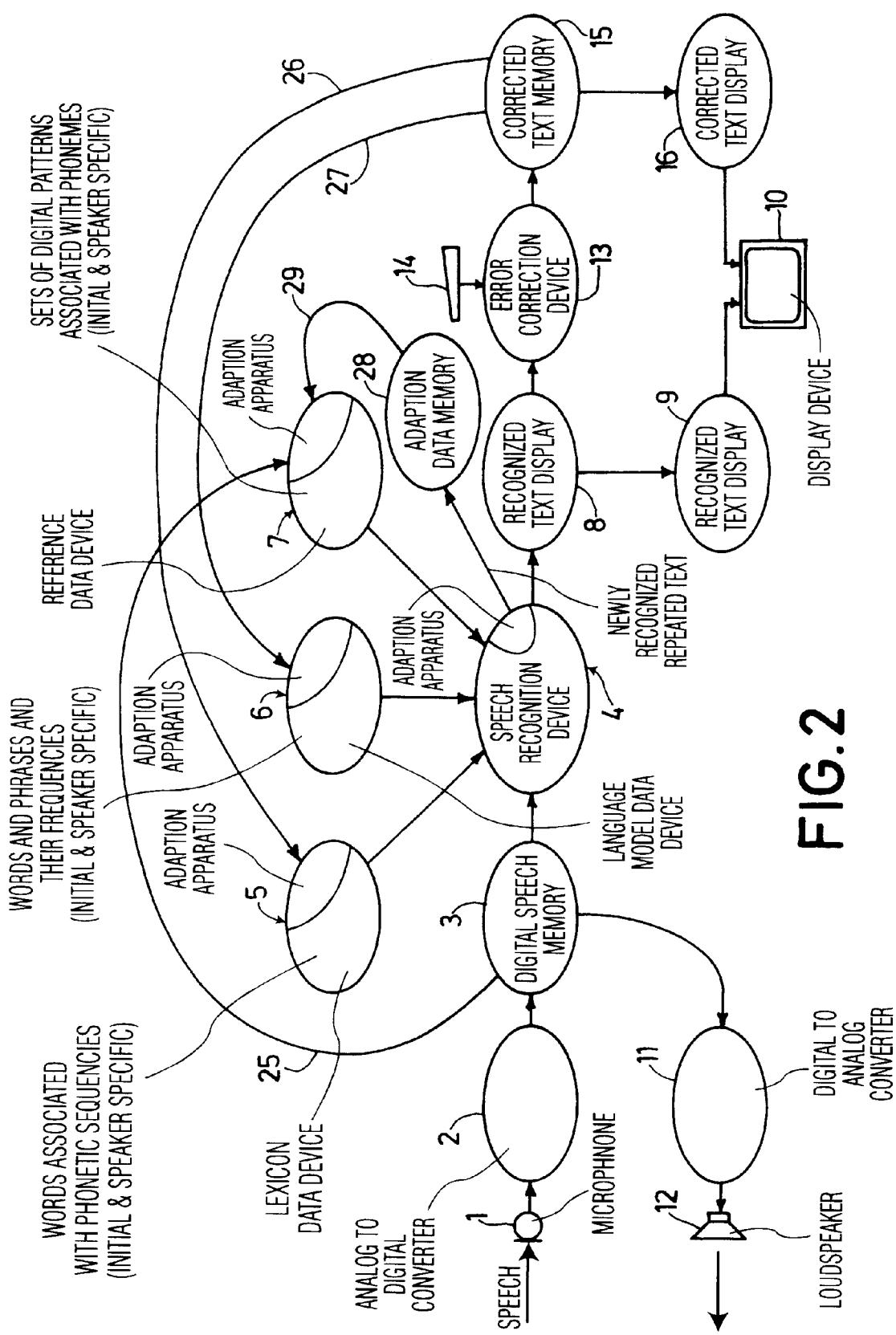
FIG. 2, in the same way as FIG. 1, shows a method of recognizing a spoken text in accordance with the invention.

A method in accordance with the invention for recognizing a spoken text will be described hereinafter with reference to FIG. 2. In FIG. 2 those steps of the method which are relevant in the present context are shown diagrammatically as blocks. Some steps of the method in accordance with the invention are at least substantially similar to steps of known methods described with reference to FIG. 1, for which reason, these steps of the method are described below only briefly. For clarity of description, the same reference numbers are used for related steps, but these steps may be significantly different in the invention.

In the method in accordance with the invention, a speaker speaks text into microphone 1, which supplies the analog electric signal. In block 2 the spoken text supplied in the form of analog electric signals is converted into first digital data in an analog-to-digital conversion process performed by an analog-to-digital converter. The digital data represent the spoken text and are loaded into memory block 3.

Furthermore, the first digital data representing the spoken text are subjected to a speech recognition process performed by a speech recognition device in block 4. In the same way as in the known method, this speech recognition process in the method in accordance with the invention, is also based on: lexicon data representing a lexicon and available in a lexicon data device in block 5, language model data representing a language model and available in a language model data device in block 6, and reference data representing phonemes and available in a reference data device in block 7. In the same way as in the known method in accordance with FIG. 1, second digital data are generated which represent recognized text during the speech recognition process carried out in block 4 in the method in accordance with the invention. The second digital data are loaded into memory block 8.

In a first operating mode of the method in accordance with the invention, the entire spoken text of block 3 can be stored in a memory and cannot be subjected to a speech recognition process in block 4 until it has been stored. In a second operating mode, however, spoken text can be continuously subjected to a speech recognition process in block 4 while this text is spoken.

In block 9, the recognized text is displayed on display device 10, i.e. a monitor, using the second digital data. By displaying the recognized text, a speaker or other user such as a typist, is given the opportunity to check the recognized text and to correct errors in the recognized text, preferably on the basis of automated error detection and in parallel with the speech recognition process.

In order to enable the recognized text to be checked in a simple manner, the first digital data representing the spoken text stored in memory block 3, are re-converted into analog electric signals in a digital-to-analog conversion process performed by a digital-to-analog converter in the block 11. The resulting analog signals are subsequently applied to a loudspeaker 12 for acoustic reproduction of the spoken text. By listening to the acoustically reproduced spoken text and by reading the displayed recognized text the recognized text, can be checked very simply for exactness or errors.

If in the method in accordance with the invention, a continuous recognition of the spoken text is provided in the second operating mode, during which a spoken text is recognized and continuously displayed, the recognized text can be checked by continuously reading the displayed recognized text.

When the user detects an error in the recognized text, on the basis of an error detection in the speech recognition process in block 4, the user can carry out a correction process using an error correction device in block 13. In the correction process the user generates third digital data using keyboard 14 and the second digital data is partly replaced by the third digital data in order to correct the recognized text in block 13. This partial replacement of the second digital data with entered third digital data results in fourth digital data representing corrected text. The fourth digital data representing the corrected text, are loaded into a memory in block 15. The stored fourth digital data are displayed block 16, which presents the corrected text on display device 10. This concludes the actual speech recognition process in the method in accordance with the invention.

However, as already stated in the description of the known method in accordance with FIG. 1, it also is very effective in the speech recognition method in accordance with the invention described with reference to FIG. 2, to adapt the reference data available in a reference data device in block 7 to the relevant speaker. This results in improved recognition quality during subsequent speech recognition processes of further spoken text uttered by the speaker (same person). In order to adapt the available (initial) reference data in the method in accordance with the invention, the following steps in the method in accordance with the invention, are carried out in an advantageous manner using as much as possible, the apparatus already described above in relation to FIG. 2.

After the fourth digital data representing the corrected text and stored in memory block 15, has been received as indicated by arrows 26 and 27, both the lexicon data available in a lexicon data device in block 5 and the language model data available in a language model data device in block 6, are adapted to the speaker using the fourth digital data.

After this adaptation of the lexicon data and the language model data the first digital data representing the spoken text and stored in memory block 3, are again subjected to a speech recognition process using the speech recognition device in block 4. This speech recognition process utilizes the adapted lexicon data, the adapted language model data, and the reference data that have not yet been adapted. In the new speech recognition process performed in block 4, fifth digital data are generated which represent a newly recognized text. The fifth digital data are stored in memory block 28.

Furthermore, the method in accordance with the invention, uses the fifth digital data representing the newly recognized text and stored in memory block 28, as adaptation data. The fifth digital data used as adaptation data, and the first digital data stored in a memory in block 3 are applied to the reference data device in block 7 as indicated by arrows 29 and 25. This adapts the reference data stored in the reference data device to the speaker of the spoken text. As a result of this adaptation, the reference data, i.e. the reference patterns for the various phonemes, are better adapted to the speaker of the spoken text, which leads to better recognition quality during a subsequent speech recognition process of a spoken text uttered by the speaker.

A system in accordance with the invention for recognizing a spoken text, will now be described with reference to FIG. 3, by which the speech recognition method explained with reference to FIG. 2, can be carried out.

Figure 3:
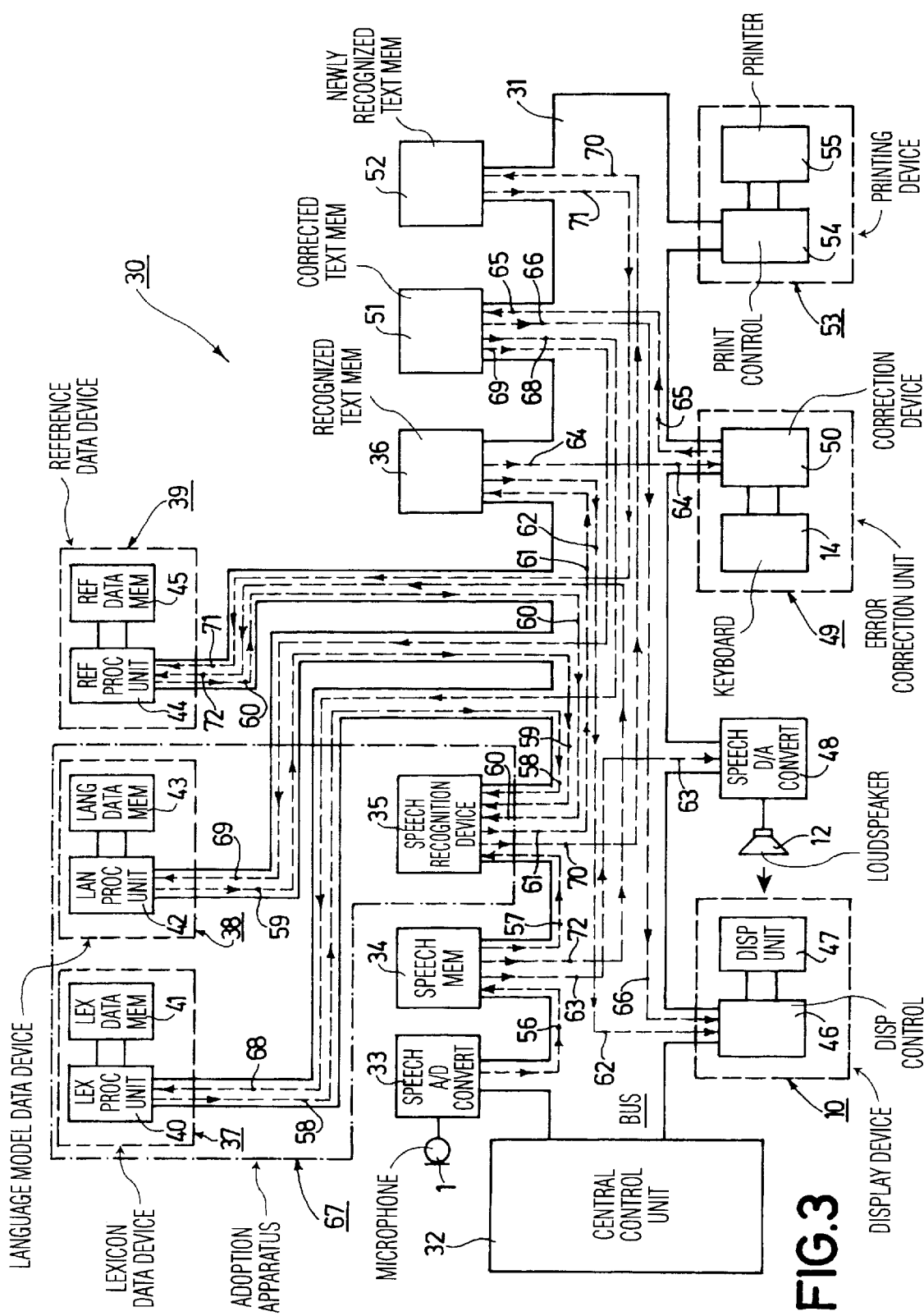
FIG. 3 is a block-schematic diagram showing a system for recognizing a spoken text in accordance with the invention, in which reference data representing phonemes can be adapted rapidly and effectively.

FIG. 3 shows system 30 in accordance with the invention, which has been implemented using a personal computer. System 30 includes bus 31 which in known manner, comprises a predetermined number of address lines, a predetermined number of data lines, and a predetermined number of control lines. Bus 31 connects the various units of system 30 and provides data transfer between the various units of system 30. Central control unit 32 of system 30 is connected to bus 31. Using central control unit 32, a program can be run to control the various processes in system 30. One of the essential functions of central control unit 32 is to control the data transfer between the individual units of system 30. In FIG. 3, this data transfer is represented diagrammatically by broken lines having arrowheads to indicate the directions, but the control of the data transfer by CPU 30 is not shown for clarity of description.

System 30 includes first speech signal conversion device 33, which comprises an analog-to-digital converter which converts the analog electric signals corresponding to a spoken text and supplied by the microphone 1, into first digital data. To store the first digital data, system 30 includes memory device 34 connected to bus 31.

System 30 further includes speech recognition device 35 connected to bus 31. In a first operating mode of system 30, the first digital data stored in the first memory device 34 can be applied directly to speech recognition device 35. In a second operating mode of system 30, the first digital data supplied by speech signal conversion device 33, can be applied directly to speech recognition device 35. Speech recognition device 35 is adapted to supply second digital data representing a recognized text and generated in a first speech recognition process using the first digital data. To store the second digital data system 30 includes second memory device 36 connected to bus 31.

When the speech recognition device of system 30 performs a speech recognition process it utilizes: lexicon data available in system 30 and representing a lexicon; language model data available in system 30 and representing a language model; and reference data available in system 30 and representing phonemes. For this purpose, system 30 respectively includes: lexicon data device 37 connected to bus 31; language model data device 38 connected to bus 31; and reference data device 39 connected to bus 31. Lexicon data device 37 comprises first data processing unit 40 connected to bus 31, and lexicon data memory device 41 connected to first data processing unit 40 via bus 31, which is shown only symbolically in FIG. 3. Language model data device 38 comprises second data processing unit 42 connected to bus 31, and language model data memory device 43 connected to data processing unit 42 via bus 31. Reference data device 39 comprises third data processing unit 44 connected to bus 31, and reference data memory device 45 connected to third data processing unit 44 via bus 31.

System 30 as shown in FIG. 3, further has display device 10 connected to bus 31. Display device 10 comprises display driver 46 connected to bus 31, and display unit 47 connected to display driver 46 via bus 31 and by which a text to be read, can be displayed.

System 30 further has second speech signal conversion device 48 connected to bus 31. Second speech signal conversion device 48 basically comprises a digital-to-analog converter. Second speech signal conversion device 48 reconverts the first digital data representing the spoken text and stored in the first memory device 34, into analog electric signals which can be applied to loudspeaker 12 connected to speech signal conversion device 48 for the acoustic reproduction of the spoken text.

System 30 further has error correction unit 49 connected to bus 31. Error correction unit 49 comprises correction device 50 connected to bus 31, and a correction input device comprising keyboard 14 connected to correction device 50 via-bus 31. Using error correction unit 49, i.e. keyboard 14, third digital data can be entered in order to correct the recognized text represented by the second digital data stored in second memory device 36. A part of the second digital data can be replaced by the third digital data, thus correction device 50 generates fourth digital data which represent a corrected text.

To store the fourth digital data, system 30 has third memory device 51 connected to bus 31.

System 30 further has fourth memory device 52 connected to bus 31, to store fifth digital data representing a newly recognized text. The generation of these fifth digital data will be described in detail hereinafter.

System 30 further has a printing device 53 connected to the bus 31. Printing device 53 comprises a printer control device 54 connected to bus 31, and printer 55 connected to printer control device 54 via bus 31.

In the foregoing, the individual units of system 30 have been described. Hereinafter, some processes in the system 30 which are important in the present context, will be explained. Data transfer is represented by a broken line in FIG. 3, from one unit to another unit of system 30. Such a data transfer is actually not directly from one unit of system 30 to another unit of system 30, as indicated by the relevant line, but practically always proceeds via central control unit 32 of the system 30, which transfer is not shown in FIG. 3 for the clarity of the drawing.

When the user of system 30, i.e. the speaker, speaks a text of a given length, for example a length of a few minutes, into microphone 1, the spoken text is transferred from the microphone 1 to first speech signal conversion device 33 in the form of analog electric signals. The spoken text is converted into first digital data in an analog-to-digital conversion process, by the analog-to-digital converter in first speech signal conversion device 33. Under control of central control unit 32, the first digital data (generated by first speech signal conversion device 33 in the afore-mentioned first operating mode), are transferred to first memory device 34 and stored in the first memory device 34 via bus 31, as indicated by broken line 56.

First digital data stored in first memory device 34, is transmitted from this memory device to speech recognition device 35, as indicated by broken line 57, via bus 31, under control of the central control unit 32. In the previously mentioned second operating mode, this transfer of the first digital data to speech recognition device 35 can occur simultaneously with the storage of the first digital data in first memory device 34. Alternatively, in the first operating mode this transfer can occur upon completion of the storage of the first digital data corresponding to a spoken text of a given length in first memory device 34.

In speech recognition device 35, the first digital data are subjected to a speech recognition process. During this speech recognition process, lexicon data representing a lexicon and stored in the lexicon data memory device 41 of the lexicon data device 37, are applied to speech recognition device 35 by the first data processing unit 40 of lexicon data device 37, via bus 31, as indicated by the broken line 58, in order to be used in this speech recognition process. Moreover, during this speech recognition process, language model data representing a language model and stored in language model data memory device 43 of language model data device 38, are transmitted to speech recognition device 35 by second data processing unit 42 via bus 31, as indicated by broken line 59, in order to be used in this speech recognition process. Furthermore, during this speech recognition process, reference data representing phonemes and stored in reference data memory device 45 of reference data device 39, are transmitted to the speech recognition device 35 via the third data processing unit 44 of the reference data device 39, as indicated by the broken line 60, in order to be used in this speech recognition process.

During the speech recognition process carried out by speech recognition device 35, phonemes and phoneme sequences are recognized depending on the first digital data representing the spoken text using reference data representing the phonemes, and finally, words and word sequences are recognized using recognized phonemes and phoneme sequences, the lexicon data, and the language model data.

The implementation of such speech recognition processes is a technology which is known per se and which is not described any further hereinafter. Second digital data representing a recognized text are generated during the speech recognition process carried out by means of the speech recognition device 35. Under control of central control unit 32, the second digital data generated by speech recognition device 35 are transmitted to second memory device 36 and stored in memory device 36 via bus 31.

The second digital data stored in second memory device 36 are transferred to display device 10, as indicated by broken line 62. This transfer is also under control of the central control unit 32. In display device 10, the applied second digital data are processed by display driver 46, after which the recognized text is displayed by display device 10, i.e. by using display unit 47 and the second digital data. As a result of the display of the recognized text, a user can check the recognized text in order to correct errors in the recognized text, preferably potential errors detected in the speech recognition process are displayed to assist the user in such correction.

In order to enable the recognized text to be checked in a simple manner, the first digital data representing the spoken text stored in first memory device 34, can be transferred to second speech signal conversion device 48. The transfer is under the control of central control unit 32, via bus 31, and as indicated by broken line 63. In second speech signal conversion device 48, the first digital data are converted into analog electric signals by the digital-to-analog converter in second speech signal conversion device 48. The signals are subsequently applied to loudspeaker 12 for acoustic reproduction of the spoken text. By listening to the acoustically reproduced spoken text and by reading the displayed recognized text, the recognized text can be checked very simply for exactness or errors. When the user detects an error in the recognized text on the basis of an error detection in the speech recognition process carried out by speech recognition device 35, the user can carry out a correction process using error correction unit 49 by using keyboard 14 of error correction unit 49 to generate third digital data, which are transmitted to correction device 50 of the error correction unit 49. In addition, the second digital data representing the recognized text are transmitted to correction device 50, via the bus 31, under control of the central control unit 32. In correction device 50 of error correction unit 49, a part of the second digital data is replaced by the third digital data entered by using keyboard 14 in order to correct the recognized text. This partial replacement of the second digital data by the entered third digital data in correction device 50, results in fourth digital data representing a corrected text. The fourth digital data representing the corrected text, are transferred from correction device 50 of error correction unit 49, to third memory device 51 which stores the fourth digital data representing the corrected text, via the bus 31, as indicated by the broken line 65, under control of central control unit 32. The stored fourth digital data are also transferred from third memory device 51 to display device 10 via bus 31, as indicated by broken line 66, under control of central control unit 32, so that the corrected text is now displayed by display means 47 of display device 10. This concludes the actual speech recognition process carried out by means of system 30.

System 30 in accordance with FIG. 3, now also adapts the reference data stored in the reference data memory device 45 of the reference data device 39, in accordance with the method described with reference to FIG. 2, to the relevant speaker. This provides an improved recognition quality in a new speech recognition process, of further text uttered by a speaker already known to the system.

To adapt the reference data stored in reference data memory device 45 of reference data device 39, system 30 shown in FIG. 3, advantageously requires hardly any additional apparatus because this adaptation utilizes adaptation apparatus 67, incorporated within units which are available anyway. In system 30 these adaptation apparatus 67 are formed in a particularly simple manner by speech recognition device 35, lexicon data device 37 and language model data device 38. With the aid of adaptation apparatus 67, upon reception of the fourth digital data representing the corrected text and stored in third memory device 51, the fourth digital data are transmitted to lexicon data device 37 and to language model data device 38 in system 30, under control of the central control unit 32, as indicated by the broken lines 68 and 69. In lexicon data device 37, the applied fourth digital data are processed by first data processing unit 40 and subsequently, the lexicon data is stored. Thus the lexicon data available in lexicon data memory device 42 are adapted to the speaker of the text on the basis of the fourth digital data, resulting in adapted lexicon data which are stored in lexicon data memory device 41. In language model data device 38, the applied fourth digital data are processed by second data processing unit 42 and the language model data are stored and thus available in language model data device 43. Thus, the language model data are adapted to the speaker of the spoken text by second data processing unit 42, depending on the fourth digital data, resulting in adapted language model data which are stored in the language model data memory device 43.

After this adaptation process of the lexicon data and the language model data, the first digital data representing the spoken text and stored in the first memory device 34, are again applied to speech recognition device 35 via bus 31, under control of central control unit 32, as indicated by broken line 57. In speech recognition device 35, the first digital data are again subjected to a speech recognition process. In this second speech recognition process, allowance is made for the adapted lexicon data stored in lexicon data memory device 41. The adapted lexicon data are transmitted to speech recognition device 35, via bus 31, under control-of central control unit 32, and as indicated by the broken lines 58. Also, the adapted language model data stored in language model data memory device 43, are transmitted to the speech recognition device 35, via bus 31, under control of central control unit 32, and as indicated by the broken lines 59. This second speech recognition process depends on the still non-adapted reference data stored in reference data device 45 and applied to speech recognition device 35, via bus 31, under control of central control unit 32, and as indicated by broken line 60. In the repeated (second) speech recognition process, speech recognition device 35 generates fifth digital data representing a newly recognized text. The fifth digital data are transmitted from speech recognition device 35 to the fourth memory device 52 and loaded into fourth memory device 52, via bus 31, under control of the central control unit 32, and as indicated by broken line 70.

In the system as shown in FIG. 3, the fifth digital data stored in fourth memory device 52 and representing the newly recognized text, are used as adaptation data for adapting the reference data stored in reference data memory device 45 of reference data device 39. In order to achieve an adaptation of the reference data stored in reference data memory device 45, the fifth digital data stored in fourth memory device 52, are transferred to reference data device 39, via bus 31, under control of central control unit 32, and as indicated by broken line 71. For this purpose, the first digital data stored in first memory device 34, are also transmitted to reference data device 39, via bus 31 under control of central control unit 32, and as indicated by broken line 72. The fifth digital data transmitted to the reference data device 39, forming the adaptation data, and representing the newly recognized text, and the first digital data transmitted to reference data device 39 and representing the spoken text, are processed in third data processing unit 44 of the reference data device 39. The processing is essential to derive new representations of phonemes from the spoken text using the newly recognized text. After this process has been carried out, third data processing unit 44 adapts the reference data stored in reference data memory device 45, to the speaker of this text, using the previously derived representations of phonemes. As a result of this adaptation, the reference data (i.e. the reference patterns for the various phonemes) are better adapted to the speaker, which leads to better recognition quality during a subsequent speech recognition process of spoken text subsequently uttered by this speaker.

System 30 as shown in FIG. 3, can be used to print the spoken text, the recognized text, the corrected text and the newly recognized text using printing device 53. For this purpose, the first digital data stored in first memory device 34 and representing the spoken text, the second digital data stored in second memory device 36 and representing the recognized text, the fourth digital data stored in third memory device 51 and representing the corrected text, and the fifth digital data stored in fourth memory device 52 and representing the newly recognized text, can be transmitted selectively to printing device 53, via bus 31, under control of central control unit 32. The transmitted data are processed by printer control device 54 of printing device 53, after which the relevant text is printed by printer 55 of printing device 53.

In system 30 implemented by means of a personal computer and shown in FIG. 3, speech recognition device 35, first data processing unit 40 of lexicon data device 37, second data processing unit 42 of language model data device 38, third data processing unit 44 of reference data device 39, display driver 46 of display device 10, correction unit 50 of error correction unit 49, and printer control device 54 of printing device 53, may be provided by the central processing unit (CPU) of the personal computer in combination with programmed memory, at different times.

System 30 as shown in FIG. 3, includes several memory devices, i.e. first memory device 34, second memory device 36, third memory device 51, fourth memory device 52, lexicon data memory device 41, language model data memory device 43, and reference data memory device 45. Each of these memory devices may be provided by portions of the main memory and the associated fixed-disk storage, i.e. the hard disk of the personal computer.

As is apparent from the foregoing description of the method in accordance with the invention and of the system in accordance with the invention, the adaptation apparatus for the generation of the adaptation data by which the reference data available in the reference data device, can be adapted to a spoken text (and thus, to the speaker of a spoken text), are primarily constituted by apparatus which are already available for speech recognition (i.e. by the speech recognition device, the lexicon data device and the language model data device) so that no major new components are required. This is advantageous for providing an implementation that is as simple as possible and low-cost. Another advantage is that the adaptation of the reference data to a speaker of a-spoken text is provided using data representing the newly recognized text and forming the adaptation data, which very well matches with the spoken text, and as a consequence, the adaptation of the reference data on the basis of the data representing the newly recognized text and the data representing the spoken text can be performed particularly rapidly and effectively.

Figure 4:
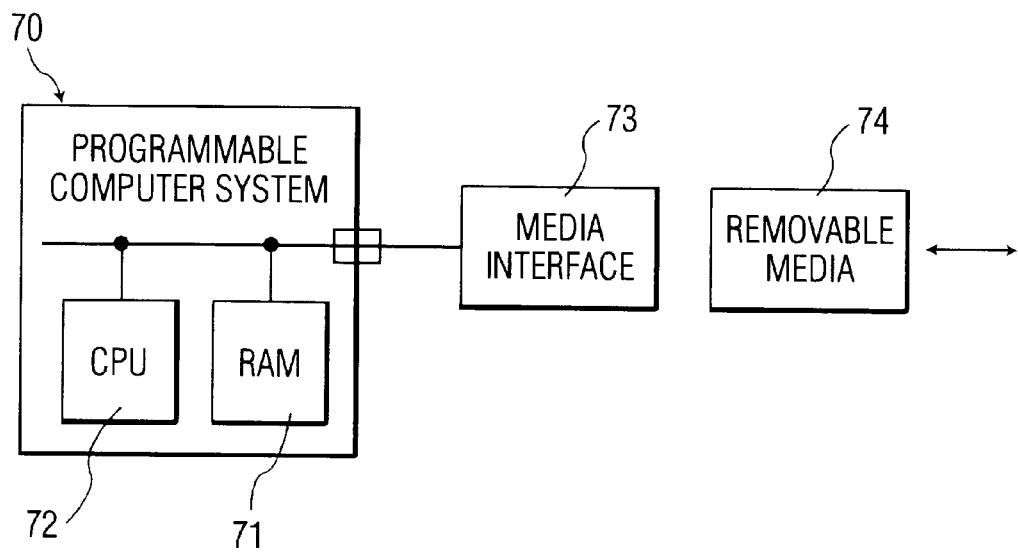
FIG. 4 is a block diagram of a computer system with removable computer media.

FIG. 4 includes a computer system 70 with programmable random access memory (RAM) 71 and CPU 72 connected by a bus and communicating with media interface 73 for reading media 74. In order to maximize clarity, other well known necessary and optional components of computer systems such as cases, power supplies, read only memory, I/O processors, keyboards, displays, sound systems, printers, communication adaptors, and modems are not shown and require no further discussion herein. The removable media includes programmed means for generating signals to program the programmable computer to provide any one of the novel combinations of apparatus of the invention described above (e.g. in relation to FIG. 3) so that the computer system can implement any one of the novel methods of the invention described above. Such media may include connectable hard disks, computer cartridges, computer cards, floppy disks, CD-ROM disks, DVD disks, computer tape or any other media that can be connected to a computer to program the computer or to provide signals to program the computer.

Figure 5:
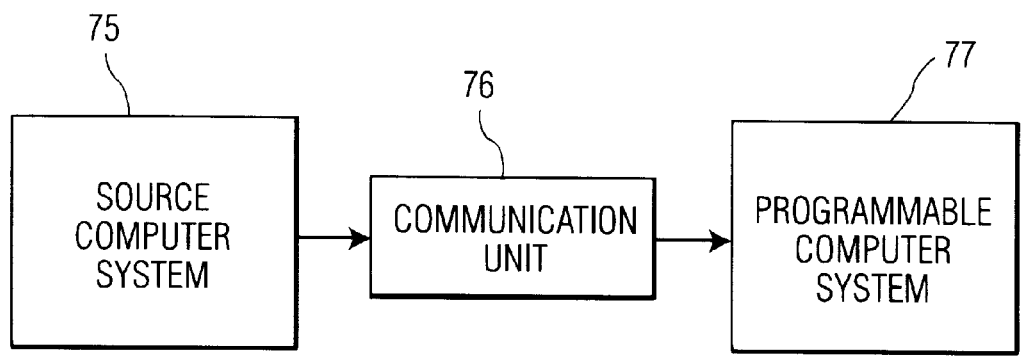
FIG. 5 is a block diagram of communicating computer systems.

FIG. 5 includes a source computer system 75 connected to a programmable computer system 76 through a communication unit 77 to form a network computer system. The source computer system includes all the apparatus necessary to program the programmable computer to provide any one of the novel combinations of apparatus of the invention that can be understood from the above description and so that the computer system can implement any one of the novel methods of the invention described above, the communication unit may include an internet, cable, telephone system, radiation source and detector, cellular phone system or other communication equipment. The source computer may be similar to the programmable computer or may be a host connected to a communication network or a server or a portable hard drive, or other computer equipment capable of generating signals to program the programmable computer.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims:

What is claimed is:

1. A method of recognizing a spoken text, comprising the steps of:
    converting spoken text uttered by a speaker into first digital data;
    converting the first digital data which represent the spoken text, into second digital data which represent recognized text in a speech recognition process depending on conversion data including: available lexicon data which represent a lexicon, available language model data which represent a language model, and available reference data which represent phonemes;
    communicating the recognized text;
    obtaining third digital data which represent corrections to the recognized text, depending on the communication of recognized text;
    correcting the second digital data using the third digital data to generate fourth digital data which represent corrected text;
    adapting the speech recognition process to the speaker depending on the fourth digital data;
    converting the first digital data into fifth digital data which represent additionally recognized text using the adapted speech recognition process; and
    adapting the available reference data to the speaker depending on the fifth digital data and the first digital data.

2. The method of claim 1 in which:
    the step of communicating includes displaying the recognized text to the speaker;
    the step of communicating includes communicating by sound;
    the step of correcting includes replacing portions of the second digital data with portions of the third digital data;
    the step of adapting the speech recognition process includes the steps of:
        adapting the available lexicon data to the speaker depending on the fourth digital data; and adapting the available language model data to the speaker depending on the fourth digital data; and
        generating fifth digital data in the speech recognition process depending on the adapted lexicon data, adapted language model data, and the first digital data; and
    the step of adapting the available reference data depends on the fifth digital data which depends on the first digital data.

3. A system for recognizing a spoken text, comprising:
    conversion means for converting the spoken text uttered by a speaker into first digital text means data which represent the spoken text;
    a speech recognition unit, including:
        lexicon data means for storing lexicon data which represent a lexicon;
        language model data means for storing language model data which represent a language model;
        reference data means for storing reference data which represent phonemes; and
        speech recognition means to generate second digital text data which represent recognized text, in a speech recognition process depending on conversion data including: the first digital text data, the lexicon data, the language model data, and the reference data;
    means for obtaining third digital text data representing error correction data;
    error correction means for correcting the recognized text represented by the second digital text data depending on the third digital text data, by changing a part of the second digital text data depending on the third digital text data, and to generate fourth digital text data which represent corrected text; and
    adaptation means for adapting the speech recognition unit based on digital text data, including:
        means for adapting the lexicon data to the speaker depending on the fourth digital text data and storing the adapted lexicon data in the lexicon data means;
        means for adapting the language model data to the speaker depending on the fourth digital text data and storing the adapted language model data in the language model data means:
        means for adapting the reference data to the speaker depending on the first digital text data and the fourth digital text data and storing the adapted reference data in the reference data means; re-adaption means, including:
            means for converting the first digital data into fifth digital data which represent newly recognized text, using the speech recognition unit after the adaptation means has adapted the speech recognition data depending on the fourth digital data; and the adaptation means being for adapting the available reference data to the speaker of the spoken text depending on the fifth digital data and the first digital data.

4. A system as claimed in claim 3, in which:

the system is implemented by means of a personal computer; and the means for obtaining include: an analog to digital converter and a speaker, a display to display the recognized text, and a keyboard for entry of corrections to the recognized speech.

5. Apparatus for generating signals for operating a first computer system to recognize spoken text, comprising:

conversion means for converting the spoken text uttered by a speaker into first digital text data which represent the spoken text;

a speech recognition unit, including:
lexicon data means for storing lexicon data which represent a lexicon stored in the lexicon data device, and;
language model data means for storing language model data which represent a language model;
reference data means for storing reference data which represent phonemes;
speech recognition means to generate second digital text data which represent recognized text, in a speech recognition process depending on the first digital text data, the lexicon data, the language model data, and the reference data;
means for obtaining third digital text data representing error correction data; and
error correction means for correcting the recognized text represented by the second digital text data depending on the third digital text data, by changing a part of the second digital text data depending on the third digital text data, and to generate fourth digital text data which represent corrected text;

adaptation means for adapting the speech recognition unit based on digital text data, including:
means for adapting the lexicon data to the speaker depending on digital text data and storing the adapted lexicon data in the lexicon data means;
means for adapting the language model data to the speaker depending on digital text data and storing the adapted language model data in the language model data means: and
means for adapting the reference data to the speaker depending on digital text data and storing the adapted reference data in the reference data means; and re-adaption means, including:
means for converting the first digital data into fifth digital data which represent newly recognized text, using the speech recognition unit after the adaptation means had adapted the speech recognition data depending on the fourth digital data; and
the adaptation means being for adapting the available reference data to the speaker of the spoken text depending on the fifth digital data and the first digital data.

6. The apparatus of claim 5, comprising computer media.

7. The apparatus of claim 5, comprising a network including a second computer system and means for communication in between the first computer system and second computer system.

8. A method of recognizing spoken text uttered by a speaker, comprising the steps of:

converting spoken text uttered by a speaker into first digital data;

converting the first digital data which represent the spoken text, into second digital data which represent recognized text in a speech recognition process depending on conversion data including available lexicon data which represent a lexicon, available language model data which represent a language model, and available reference data which represent phonemes;

communicating the recognized text;

obtaining third digital data which represent corrections to the recognized text, depending on the communication of recognized text;

correcting the second digital data using the third digital data to generate fourth digital data which represent corrected text;

adapting the conversion data depending on the fourth digital data;

converting the first digital data, into fifth digital data which represent recognized text depending on the adapted speech data; and re-adapting the conversion data depending on the fifth digital data.

9. A system for recognizing spoken text, comprising:

conversion means for converting the spoken text uttered by a speaker into first digital text means data which represent the spoken text;

a speech recognition unit, including:
lexicon data means for storing lexicon data which represent a lexicon stored in the lexicon data device, and;

language model data means for storing language model data which represent a language model;

reference data means for storing reference data which represent phonemes;

speech recognition means to generate second digital text data which represent recognized text, in a speech recognition process depending on the first digital text data the lexicon data, the language model data, and the reference data;

means for obtaining third digital text data representing error correction data;

error correction means for correcting the recognized text represented by the second digital text data depending on the third digital text data, by changing a part of the second digital text data depending on the third digital text data, and to generate fourth digital text data which represent corrected text;

first adaption means for adapting the speech recognition unit to the speaker depending on the fourth digital data; and second adaption means for adapting the available reference data to the speaker, using the adapted speech recognition unit and depending on the first digital data.

10. The system of claim 9 in which:

the first adaption means includes means for adapting available lexicon data depending on the fourth digital data; and the first adaption means includes means for adapting available language model data depending on the fourth digital data.

* * * * *